(12) United States Patent
Schoen et al.

(10) Patent No.: US 10,287,031 B2
(45) Date of Patent: May 14, 2019

(54) AIRCRAFT LIGHT UNIT

(71) Applicant: Goodrich Lighting Systems GmbH, Lippstadt (DE)

(72) Inventors: Christian Schoen, Mainz (DE); Andre Hessling-Von Heimendahl, Koblenz (DE)

(73) Assignee: GOODRICH LIGHTING SYSTEMS GMBH, Lippstadt (DE)

( * ) Notice: Subject to any disclaimer, the term of this patent is extended or adjusted under 35 U.S.C. 154(b) by 0 days.

(21) Appl. No.: 15/927,375

(22) Filed: Mar. 21, 2018

(65) Prior Publication Data

US 2018/0281989 A1    Oct. 4, 2018

(30) Foreign Application Priority Data

Mar. 24, 2017 (EP) .................................... 17162809

(51) Int. Cl.
*B64D 47/06* (2006.01)
(52) U.S. Cl.
CPC .......... *B64D 47/06* (2013.01); *B64D 2203/00* (2013.01)
(58) Field of Classification Search
CPC ............................ B64D 47/06; B64D 2203/00
See application file for complete search history.

(56) References Cited

U.S. PATENT DOCUMENTS

| | | | | |
|---|---|---|---|---|
| 2005/0128759 A1* | 6/2005 | Fredericks | ............. | B64D 47/06 362/470 |
| 2013/0249375 A1* | 9/2013 | Panagotacos | ...... | H05B 33/0803 313/13 |

FOREIGN PATENT DOCUMENTS

| | | | | |
|---|---|---|---|---|
| CN | 204268187 U | 4/2015 | | |
| EP | 2334147 A2 * | 6/2011 | ......... | H05B 33/0857 |
| EP | 2334147 A2 | 6/2011 | | |
| EP | 2801528 A1 * | 11/2014 | ............ | B64D 47/06 |
| EP | 2801528 A1 | 11/2014 | | |
| KR | 100807210 B1 | 2/2008 | | |

OTHER PUBLICATIONS

Extended European Search Report for International Application No. 17162809.2 dated Jul. 5, 2017, 7 pages.

* cited by examiner

*Primary Examiner* — Mary Ellen Bowman
(74) *Attorney, Agent, or Firm* — Cantor Colburn LLP (57) ABSTRACT

An aircraft light unit includes a mounting portion, which is configured for mounting the light unit to an aircraft; and at least one light source, which is configured for emitting light. The light unit is configured to emit at least one first output of white light into a predefined first spatial sector and to emit at least one second output of white light into a predefined second spatial sector. The light of the at least one first output of white light comprises a first percentage of radiation having a wavelength that is shorter than a predefined threshold, and the light of the at least one second output of white light comprises a second percentage of radiation having a wavelength that is shorter than the predefined threshold, wherein the first percentage of radiation is smaller than the second percentage of radiation.

15 Claims, 6 Drawing Sheets

AIRCRAFT LIGHT UNIT

FOREIGN PRIORITY

This application claims priority to European Patent Application No. 17162809.2 filed Mar. 24, 2017, the entire contents of which is incorporated herein by reference.

TECHNICAL FIELD

The present invention is in the field of aircraft lighting. In particular, it is in the field of exterior aircraft light units that are operated during flight and/or on the ground.

BACKGROUND

Aircraft such as airplanes and helicopters comprise numerous exterior light units which are operated on the ground and/or close to ground, for example taxi lights, landing lights and beacon lights, and which may also be operated during flight, for example anti-collision lights.

Light emitted from an exterior light unit, in particular light which is reflected from the ground or from particles in the air in front of the aircraft, in particular during rainy, foggy or snowy conditions, may cause deterioration of the pilot's vision and discomfort due to glare. However, especially during these conditions, a high brightness of the lights is vital to ensure high visibility of any other air traffic.

It therefore would be beneficial to reduce the glare which is caused by the aircraft lights while maintaining an overall high intensity/brightness of the lights.

SUMMARY

Exemplary embodiments of the invention include an aircraft light unit comprising a mounting portion, which is configured for mounting the light unit to an aircraft; and at least one light source, which is configured for emitting light. The light unit is configured to emit at least one first output of white light into a predefined first spatial sector and to emit at least one second output of white light into a predefined second spatial sector. The light of the at least one first output of white light comprises a first percentage of radiation having a wavelength that is shorter than a predefined threshold, and the light of the at least one second output of white light comprises a second percentage of radiation having a wavelength that is shorter than the predefined threshold, wherein the first percentage of radiation is smaller than the second percentage of radiation. The first and second light outputs may include but are not restricted to light cones.

According to an exemplary embodiment of the invention, the white light of the first and second outputs of light in particular is "aviation white light", i.e. light which is considered as "white light" according to at least one of the aviation standards such as FAR 25, 1397; SAE AS 8037 or MIL-L-3009.

It has been found that a large portion of glare is triggered by the blue photopic receptors on the retina of the human eye. Thus, reducing the percentage of short wave radiation corresponding to blue light in the portion of the output of light which is most likely to be reflected into the eyes of the pilot(s), reduces the risk of glare considerably. Emitting light comprising a higher percentage of short wave radiation (blue light) into areas which are less prone to be reflected into the pilots' eyes, allows to employ more efficient light sources for emitting this portion of light. As a result, the light unit may be operated more efficiently than a light unit which emits only a small percentage of short wave radiation (blue light) in every direction.

As a result, exemplary embodiments of the invention provide aircraft light units which may be operated efficiently for providing the desired high intensity/brightness of the light, but which further reduce the risk that at a pilot is glared by the light emitted by the aircraft light unit.

According to an embodiment of the invention, the predefined threshold is in the range of 450 nm to 500 nm, in particular between 470 nm and 480 nm, more particularly at 475 nm. Such a threshold allows to effectively distinguish between the first light output comprising a low percentage of short wave radiation (blue light) and the second light output comprising a higher percentage of short wave radiation (blue light).

According to a further embodiment of the invention, the light of the first output has a lower correlated color temperature (cct) than the light of the second output. Light having a lower correlated color temperature comprises less short wave radiation (blue light) as part of the resulting white light than light having a higher correlated color temperature. Thus, emitting light having a low correlated color temperature as the first light output and emitting light having a higher correlated color temperature as the second light output results in a combined (total) output of light, which provides the desired high intensity/brightness of the total light output, but which also reduces the risk that a pilot is glared by the light emitted by the aircraft light unit. Both the light of the lower correlated color temperature and the light of the higher correlated color temperature is white light.

According to a further embodiment of the invention, the correlated color temperature of the light of the first output in particular is below 3500 K and the correlated color temperature of the light of the second output in particular is above 3500 K. Providing first and second light outputs with a correlated color temperature of less than 3500 K and more then 3500 K, respectively, has been proven as being efficient for providing the desired high intensity/brightness of the total light output and simultaneously reducing the risk of glare.

The skilled person will understand that light might be reflected or scattered from the predefined first spatial sector into the predefined second spatial sector and vice versa. Thus, the situation described before refers to an ideal situation. An aircraft light unit according to an exemplary embodiment of the invention is designed to approach such an ideal situation.

According to a further embodiment of the invention, the predefined first spatial sector, when projected on a horizontal plane, extends between an inner line, which extends from the aircraft light unit to a front end of the aircraft, in particular to the cockpit of the aircraft or to a position slightly behind the rear end of the cockpit, and an outer line, which extends from the aircraft light unit in a forward direction laterally outside the inner line such that the predefined first spatial sector is defined by the inner and outer lines. The inner and outer lines in particular may be oriented at an angle $\beta$ with respect to each other defining an opening angle $\beta$ of the predefined first spatial sector.

According to a further embodiment of the invention, the outer line extends through the aircraft light unit in a direction parallel to a longitudinal axis of the aircraft.

Light emitted into the predefined first spatial sector is very prone to enter the cockpit of the aircraft and to glare the pilot(s) within the cockpit. Thus, reducing the percentage of short wave radiation (blue light) emitted into the predefined first spatial sector is very efficient for reducing the risk that pilots are glared by light emitted by the aircraft light unit.

According to a further embodiment of the invention, the predefined first spatial sector, when projected on the horizontal plane, has an opening angle β in the range of 30° to 40°, in particular an opening angle β in the range of 34° to 36°. Such an opening angle β has been shown as being suitable for many aircraft geometries, in particular in situations in which the aircraft light unit is mounted to a wing of the aircraft, more particularly to a wing tip of the aircraft.

In alternative embodiments, the opening angle β may be smaller, such as 10°, 15° 20°, 25°, or 30°. The opening angle β in particular may be adjusted according to the geometry of the aircraft.

According to a further embodiment of the invention, the aircraft light unit further comprises a cover for protecting the light source(s) from negative influences from the environment. The cover is at least partially transparent in order to allow light to pass from inside the aircraft light unit to the outside. The cover may be integrated and delivered with the aircraft light unit. Alternatively, the cover may be an integral part of the aircraft, such as the fuselage or a wing/wing tip of the aircraft. In such a configuration the aircraft light unit is mounted at a position inside the aircraft facing the at least partial transparent cover. Such a protecting cover may also be referred to as lens cover, as it may have some sort of optical purpose as well.

According to a further embodiment of the invention, the aircraft light unit comprises an optical system, which in particular includes at least one lens and/or at least one reflector and which is configured for focusing the emitted light, in particular the light which is emitted as one of the first and second outputs of white light. The optical system in particular may be configured to focus the light emitted in the predefined first and/or second spatial sectors.

Focusing the emitted light allows to increase the intensity of the light, in particular within the predefined spatial sectors, without increasing the intensity of the at least one light source. Focusing the emitted light in particular allows for an efficient use of the light generated by the at least one light source. The optical system, in particular a lens, may be integrated with the cover forming a lens cover. In an embodiment, at least a portion of the cover may be formed such that it provides the functionality of a lens focusing the light passing through the cover. It is also possible that the cover has no or little optical effect and that the optical system is formed by one or more lens(es)/reflector(s) arranged between the light source(s) and the cover.

According to a further embodiment, the at least one light source comprises at least one LED. The at least one light source in particular may be an LED. LEDs provide cost and energy efficient light sources with a long life time.

According to a further embodiment, the light unit comprises a plurality of light sources. The light unit in particular may comprise at least one first light source, which is configured to emit light of the first output of white light, and at least one second light source, which is configured to emit light of the second output of white light. In such a configuration, the percentage of radiation emitted by the at least one first light source having a wavelength that is shorter than the predefined threshold in particular is smaller than the percentage of radiation emitted by the at least one second light source having a wavelength that is shorter than the predefined threshold.

Employing at least two different (kinds of) light sources, which are configured for emitting the first and second light outputs, respectively, allows for a very efficient generation of the light, since every (kind of) light source may be optimized to the respectively emitted light. In other words, a "warm" light source emitting light comprising only a small fraction of radiation having a small wavelength (blue light), in particular radiation having a wavelength below the predetermined threshold, may be employed as the at least one first light source, and a "cold" light source emitting light comprising a larger fraction of radiation having a small wavelength (blue light), in particular radiation having a wavelength below the predetermined threshold, may be employed as the at least one second light source. Such a configuration avoids losses of intensity/efficiency caused by passing the light emitted by a light source through an optical filter for reducing the percentage of radiation having a small wavelength (blue light) within the first output of light.

According to a further embodiment, less than 33%, in particular less than 25%, more particular less than 20% of the light sources are first light sources, i.e. "warm" light sources. According to an embodiment at least 10% of the light sources are first light sources. Providing less than 33% or even less than 25% or 20% but more than 10% of the light sources as first light sources results in a reasonable compromise between maintaining a high intensity of the emitted light and reducing the risk of glare.

Exemplary embodiments of the invention further include an aircraft light unit comprising at least one optical filter which is configured for at least partially blocking radiation with a wavelength that is shorter than the predefined threshold. The at least one optical filter in particular is arranged so that the radiation which is emitted as the first output of white light is transmitted through the at least one optical filter in order to at least partially block radiation having a wavelength below the predetermined threshold.

Employing at least one optical filter allows to generate first and second light outputs with different percentages of light having a small wavelength, i.e. a wavelength below the predetermined threshold, using only a single type of light sources, for example a plurality of similar or identical light sources emitting similar or (nearly) identical spectra.

According to a further embodiment, the light unit is configured to emit light having an intensity, in particular a peak intensity, of at least 100 cd. In order to provide enough light for sufficiently illuminating the ground in the vicinity of the aircraft, the light unit in particular may be configured to emit light having an intensity of 400 cd to 2000 cd.

According to a further embodiment, the light unit is a white anti-collision strobe light unit, in particular a wing-tip white anti-collision strobe light unit. Anti-collision strobe lights are particularly prone for causing glare of the pilot(s). Thus, employing light units according to exemplary embodiments of the invention as white anti-collision strobe lights allows to reduce the risk of glaring the pilot(s) considerably.

However, in order to reduce the risk of glare, exemplary embodiments of the invention further may be used as all kind light units which are configured to emit predominantly white light in a generally forward direction of an aircraft. This in particular may include, landing light units, take-off light units, taxi light units and multi-functional light units providing at least two of the functionalities of a landing light unit, a take-off light unit, and a taxi light unit.

According to a further embodiment, the mounting portion of the light unit is configured for mounting the light unit to the fuselage, to a wing, in particular a wing tip portion, and/or to a running gear, in particular to a front running gear, of an aircraft. This allows to mount the light unit to the aircraft at a position/location which suits the respective functionality of the light unit best.

Exemplary embodiments of the invention further include aircraft, such as airplanes and helicopters, comprising at least one aircraft light unit according to an exemplary embodiment of the invention.

The aircraft light unit in particular may be mounted to a fuselage and/or to a wing, in particular a wing tip portion, of the aircraft.

In case of a landing light unit, a take-off light unit and/or a taxi light unit, the light unit alternatively may be mounted to a running gear, in particular to a front running gear, of the aircraft.

BRIEF DESCRIPTION OF THE DRAWINGS

Exemplary embodiments of the invention are described in detail below with reference to the figures, wherein.

DETAILED DESCRIPTION

Figure 1:
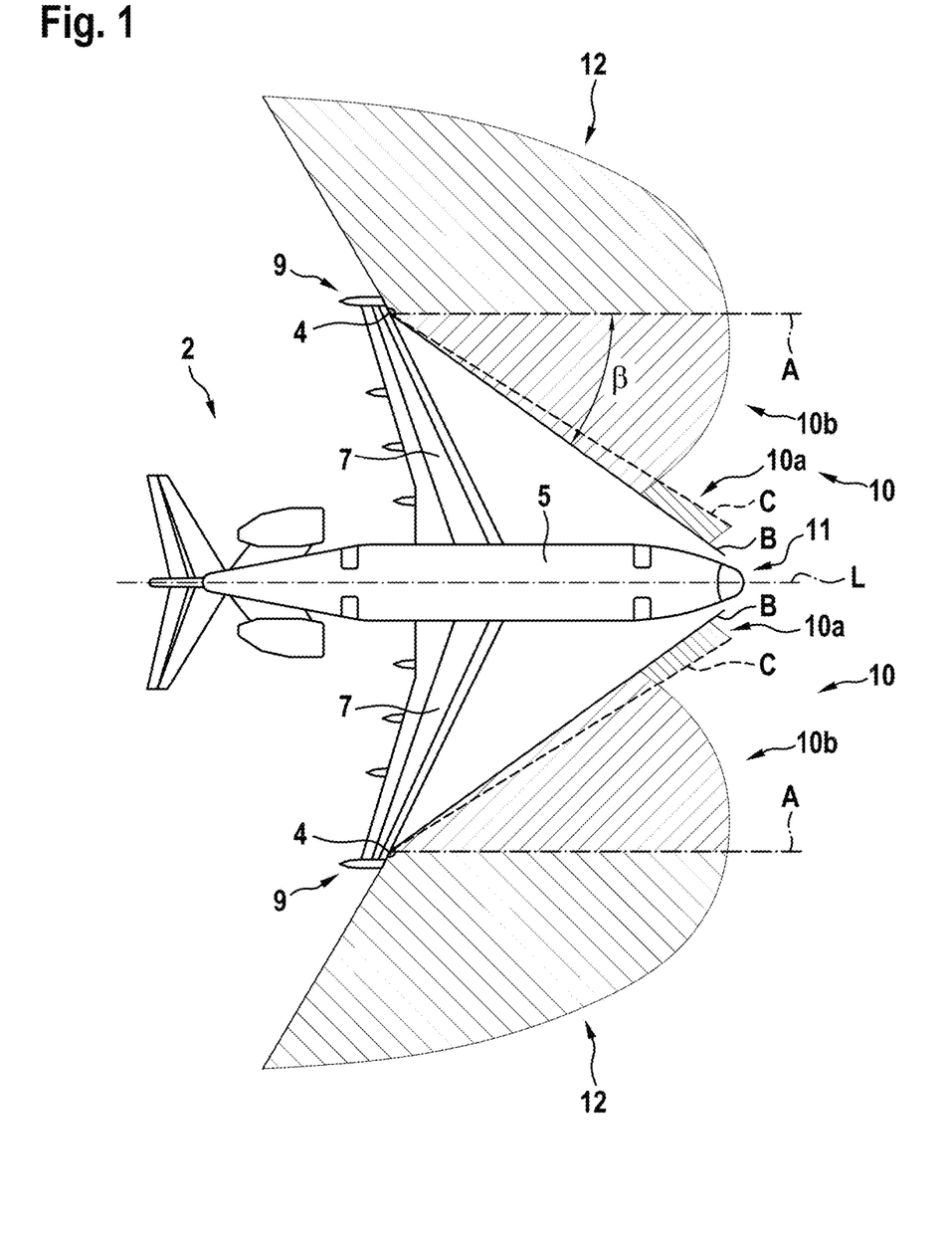
FIG. 1 shows a schematic top view of an aircraft and a typical distribution of light projected by its wing anti-collision strobe light units.

FIG. 1 shows a schematic top view of an aircraft 2 and a typical distribution of light emitted by left and right wing anti-collision strobe light units 4, which are depicted as illustrative examples of aircraft light units 4 according to exemplary embodiments of the invention.

The aircraft 2 comprises a fuselage 5 extending along a longitudinal axis L and left and right wings 7 extending at an angle from the fuselage 5. There is a cockpit 11 at the front end of the fuselage 5, which is shown on the right side of FIG. 1.

The left and right wing anti-collision strobe light units 4 are mounted at respective wing tips 9 of the wings 7 and may therefore also be referred to as left and right wing tip anti-collision light units. The left and right wing anti-collision strobe light units 4 are configured to emit light with a desired light distribution over a certain angular range (predefined spatial sectors) around a vertical axis, which extends perpendicularly to the plane of FIG. 1 through the respective aircraft light unit 4, and over a certain angular range above and below the horizontal plane of the aircraft 2, for example from −30° to +30°, with respect to this horizontal plane.

The left and right wing anti-collision strobe light units 4 in particular emit light flashes having a high intensity and aviation white light color. Typical intensity values are 400 cd to 2000 cd.

In the non-limiting embodiment depicted in FIG. 1, each of the left and right wing anti-collision strobe light units 4 are configured to emit a first output of white light into a predefined first spatial sector 10, which extends from 0°, which corresponds to a line A oriented parallel to the longitudinal axis L of the aircraft 2, about 30° to 40°, in particular 35°, inwards towards the fuselage 5 of the aircraft. Said predefined first spatial sector 10 is defined by the (outer) line A and an inner line B depicted in FIG. 1. The angle β between said two lines A, B defines an opening angle of the predefined first spatial sector 10.

Each of the left and right wing anti-collision strobe light units 4 is further configured to emit a second output of white light into a predefined second spatial sector 12, which extends from 0°, which corresponds to the line A oriented parallel to the longitudinal axis L of the aircraft 2, to approximately 120° in flight outward direction, i.e. to the outside and the rear of the aircraft 2.

Light emitted from the anti-collision strobe light units 4, in particular light which is emitted into the predefined first spatial sector 10, may glare the pilot(s) sifting within the cockpit 11, for example after being reflected by rain, snow or dirt particles present in the air.

In particular, light which is emitted into an inner subsector 10a of the predefined first spatial sector 10, which in FIG. 1 is delimited by lines B and C and which e.g. extends in a range from 30° to 40° with respect to line A, directly hits the cockpit 11 and thus may hit the eyes of the pilot(s) sitting within the cockpit 11. Light which is emitted into an outer subsector 10b of the predefined first spatial sector 10, which in FIG. 1 is delimited by lines A and C and which e.g. extends in a range from 0° to 30° with respect to the line A, may be reflected by rain drops, dust particles or fog into the direction of the cockpit 11 and thus the eyes of the pilot(s) sifting within the cockpit 11.

In order to reduce the risk of glaring the pilot(s) within the cockpit 11, the light of the at least one first output emitted into the predefined first spatial sector 10 comprises a first percentage of radiation having a wavelength that is shorter than a predefined threshold; and the light of the at least one second output emitted into the predefined second spatial sector 12 comprises a second percentage of radiation having a wavelength that is shorter than a predefined threshold, wherein the first percentage of radiation is smaller than the second percentage of radiation.

In other words, the first output of white light, which is emitted into the predefined first spatial sector 10, comprises a smaller percentage of "blue light", i.e. light having a wavelength which is smaller than the predefined threshold, than the second output of white light, which is emitted into the predefined second spatial sector 12. As glare is predominantly caused by radiation having a short wavelength, i.e. by "blue light", reducing the percentage of said radiation/blue light within the predefined first spatial sector 10 reduces the risk of glaring the pilot considerably.

However, "warm" light sources, i.e. light sources emitting a smaller percentage of light having a small wavelength (blue light) may be less effective than "cold" light sources, i.e. light sources emitting a larger percentage of light having a small wavelength. Therefore such "cold light", i.e. light comprising a larger percentage of light having a small wavelength (blue light) is emitted into the predefined second spatial sector 12. The risk that light emitted into the predefined second spatial sector 12 is reflected into the cockpit 11 is considerably lower than the risk that light which is emitted into the predefined first spatial sector 10 is reflected into the cockpit 11.

As a result, a configuration according to exemplary embodiments of the invention provides an improved aircraft illumination, in particular an aircraft illumination which considerably reduces the risk of glaring the pilot. At the same time, a high level of efficiency is maintained.

The skilled person will understand that light might be reflected or scattered from the first predefined spatial sector 10 into the second spatial sector 12 and vice versa. Thus, the situation described with reference to FIG. 1 refers to an ideal situation. Aircraft light units 4 according to exemplary embodiments of the invention are designed to approach this ideal situation.

Figure 2:
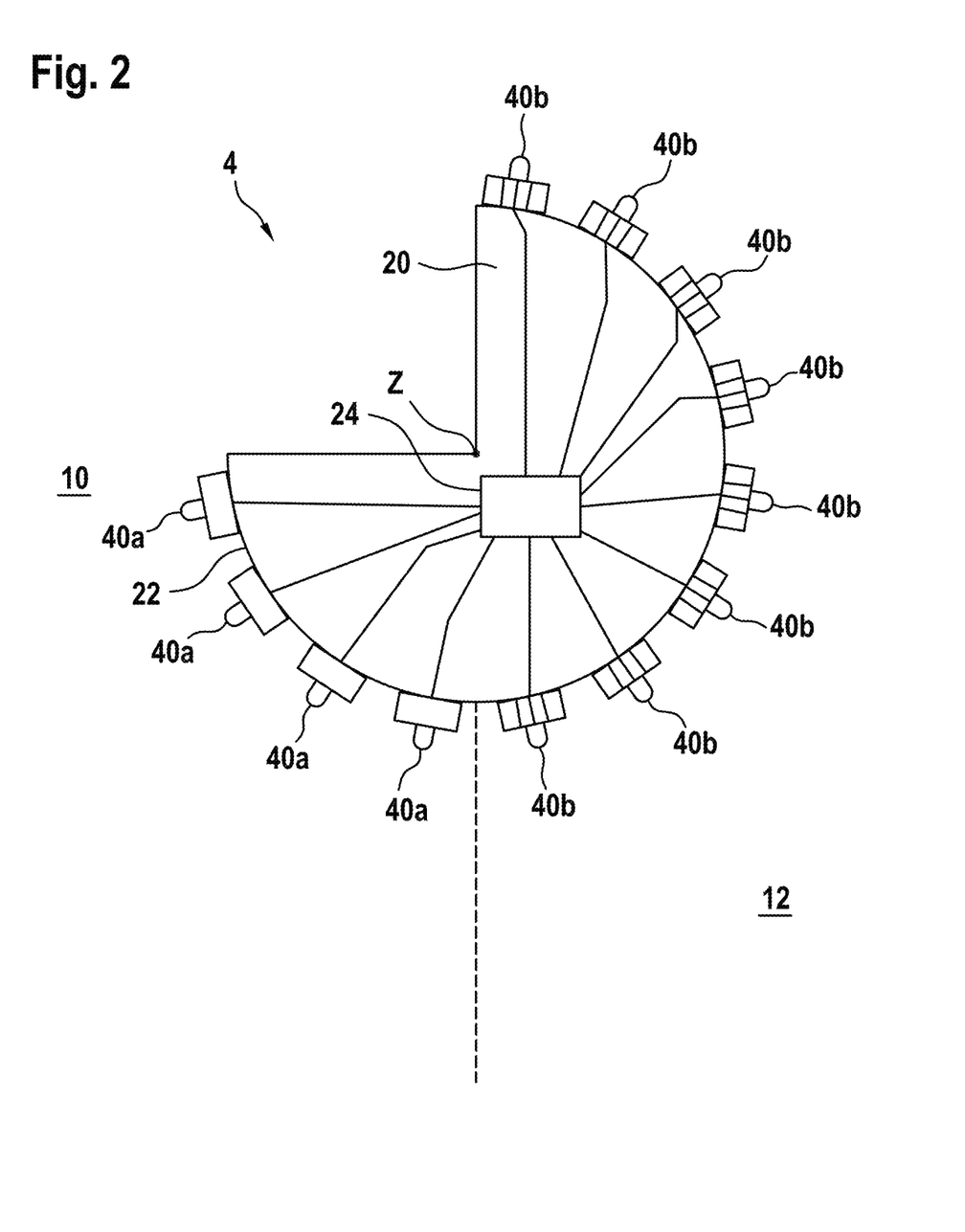
FIG. 2 shows a schematic plane view of an aircraft light unit according to an exemplary embodiment of the invention.

FIG. 2 illustrates a schematic view of an embodiment of an aircraft light unit 4, which in particular may be wing anti-collision strobe light unit 4 as it is shown in FIG. 1, but which also may be any kind of aircraft light unit 4 which is configured to emit predominantly white light in a generally forward direction, such as a landing light unit, a take-off light unit, a taxi light unit and a multi-functional light unit providing at least two of the functionalities of a landing light unit, a take-off light unit, and a taxi light unit.

The aircraft light unit 4 shown in FIG. 2 comprises a support plate 20 having the form of a three-quarter circle with a center Z and an outer support wall 22. The outer support wall 22 extends perpendicularly to the support plate 20, which is identical with the plane of FIG. 2, along the outer periphery of the support plate 20.

A plurality of light sources 40a, 40b, which in particular may be provided in the form of LEDs, are mounted to the support wall 22 such that the light sources 40a, 40b, in operation, emit light in a direction facing away from the center Z of the support plate 20.

The light sources 40a, 40b are electrically connected to a central power supply/control unit 24, which is configured to selectively switch the light sources 40a, 40b on and off.

The light sources 40a, 40b include a number of first light sources 40a, which are configured to emit light of the first output of white light, and a number of second light sources 40b, which are configured to emit light of the second output of white light. The light sources 40a, 40b in particular are configured such that the percentage of radiation emitted by the first light sources 40a having a wavelength that is shorter than the predefined threshold, is smaller than the percentage of radiation emitted by the at least one second light sources 40b having a wavelength that is shorter than the predefined threshold.

In other words, the first light sources 40a emit relatively "warm light" comprising a high percentage of radiation having a large wavelength ("red light") and a small percentage of radiation having a small wavelength ("blue light") into the predefined first spatial sector 10. The second light sources 40b emit relatively "cold light" comprising a higher percentage of radiation having a small wavelength ("red light") and a smaller percentage of radiation having a large wavelength ("red light") into the predefined second spatial sector 12.

Employing first and second light sources 40a, 40b emitting two different (kinds of) light spectra provides an easy and efficient way of emitting relatively warm light into the predefined first spatial sector 10 in order to reduce the risk of glare, and to simultaneously emit relatively cold light into the predefined second spatial sector 12 in order to provide the desired/necessary illumination intensity (brightness) with good efficiency.

An aircraft light unit 4, as it is schematically shown in FIG. 2, may be mounted to or integrated with a wing 7, in particular a wing tip 9, of an aircraft 2. The support plate 20 may be mounted to the aircraft 2, in particular to the fuselage 5, to a wing 7 or to a wing tip 9 of the aircraft 2, by means of a mounting portion, which is not shown in FIG. 2.

Figure 3:
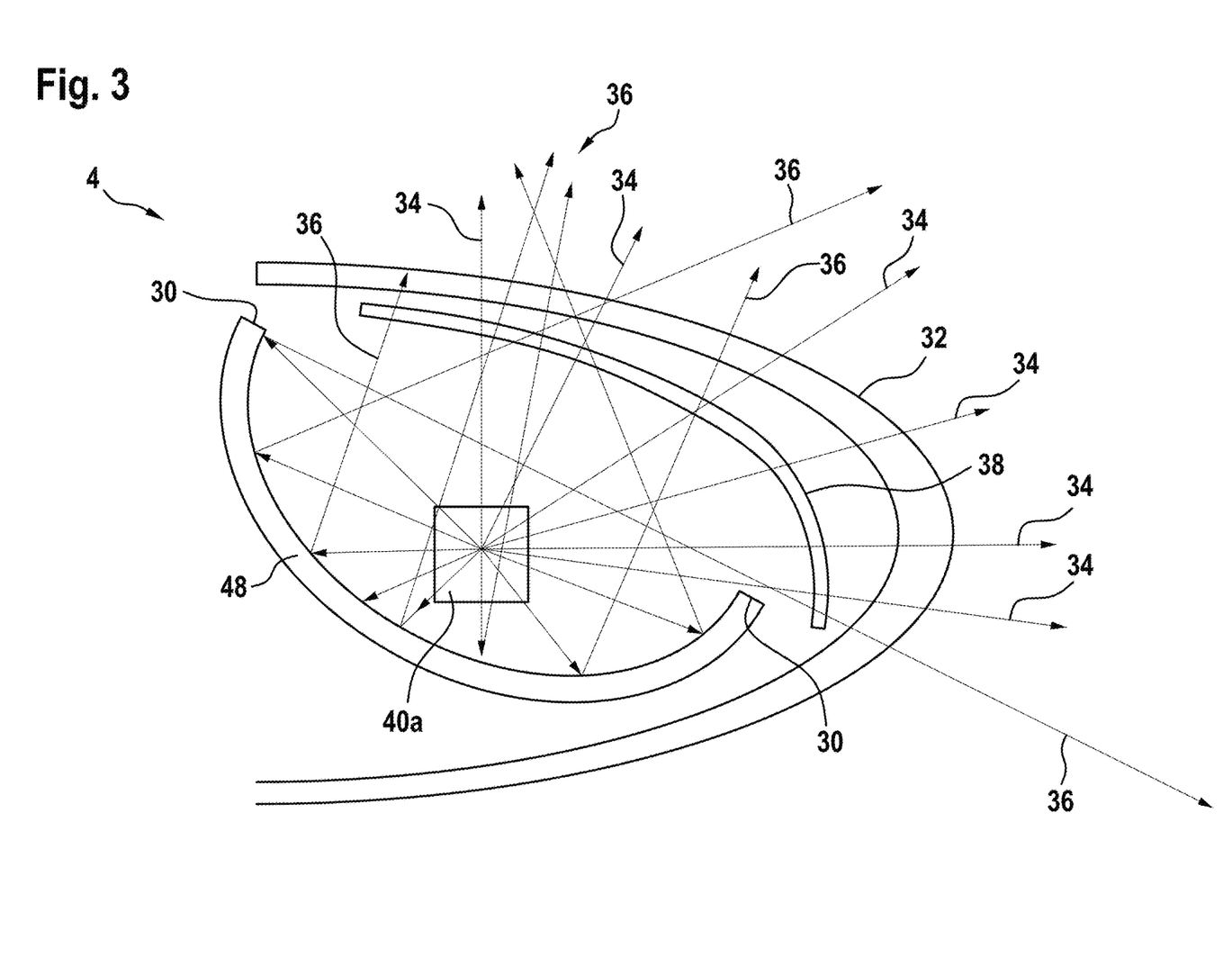
FIG. 3 shows a schematic sectional view of an aircraft light unit according to an exemplary embodiment of the invention.

FIG. 3 shows a schematic sectional view of an aircraft light unit 4, such as a wing anti-collision strobe light unit 4, according to an exemplary embodiment of the invention, which may be integrated into a wing 7 of an aircraft 2. The view of FIG. 3 is a vertical cross-sectional view, cutting through the aircraft light unit 4 along a plane that is contained in the first spatial sector 10.

The sectional view depicted in FIG. 3 in particular shows a light source 40a, a reflector element 48 and a cover lens 32.

The reflector element 48 has an arcuate shape and comprises a reflecting inner surface which is oriented obliquely in flight outward direction. The light source 40a is arranged within a space spanned by the inner reflecting surface of the reflector element 48 and a straight line connecting the end portions 30 of the reflecting inner surface of the reflector element 48.

FIG. 3 further depicts an arcuate cover lens 32 that encloses the light source 40a and the reflector element 48. The cover lens 32 closes the aircraft light unit 4 in front, flight outwards and flight inwards directions. The arcuate cover lens 32 is transparent at least in those regions that correspond to the predefined first and second spatial sectors 10, 12 illustrated in FIG. 1. The cover lens 32 in particular may be part of the aircraft light unit 4, or it may be formed integrally with a front edge of the wing 7 with the aircraft light unit 4 being mounted facing the cover lens 32.

The distribution of the light beams projected by the aircraft light unit 4 is as follows. Light beams 34 emitted by the light source 40a impinging on the arcuate cover lens 34 and passing therethrough are designated with reference numeral 34 and form direct light beams. Indirect light beams 36 are reflected by the reflector element 48 before impinging on the arcuate cover lens 34 and passing therethrough.

As mentioned with reference to FIG. 2, different kinds of light sources 40a, 40b, in particular first light sources 40a emitting relatively "warm light" comprising a small percentage of radiation having a small wavelength corresponding to "blue light" and second light sources 40b (not shown in FIG. 3) emitting relatively "cold light" comprising a higher percentage of radiation having a small wavelength corresponding to "blue light" may be employed in order to emit different kinds of white light into the predefined first and second sectors 10, 12 shown in FIG. 1, respectively.

Alternatively, only a single type of light sources 40a, 40b, i.e. light sources 40a, 40b emitting similar or identical spectra, may be employed in combination with at least one optical filter 38, which is provided on the outer surfaces of the light sources 40a, 40b and/or in the space between the reflector element 48 and the cover lens 34 in order to provide the desired kind of "white light".

In particular, in the areas emitting light of the first light output, which is directed into the predefined first spatial sector 10, an optical filter 38 may be provided, the optical filter 38 being configured to at least partially block radiation having a wavelength which is below the predetermined threshold. As a result, light comprising a smaller percentage of radiation having a small wavelength, i.e. a wavelength below the predetermined threshold, (blue light) is emitted into the predefined first spatial sector 10 reducing the risk that glare of the pilot(s) is caused by said light. In vertical cross-sections through the aircraft light unit 4 in the second spatial sector 12, no optical filter 38 may be present.

Figure 4:
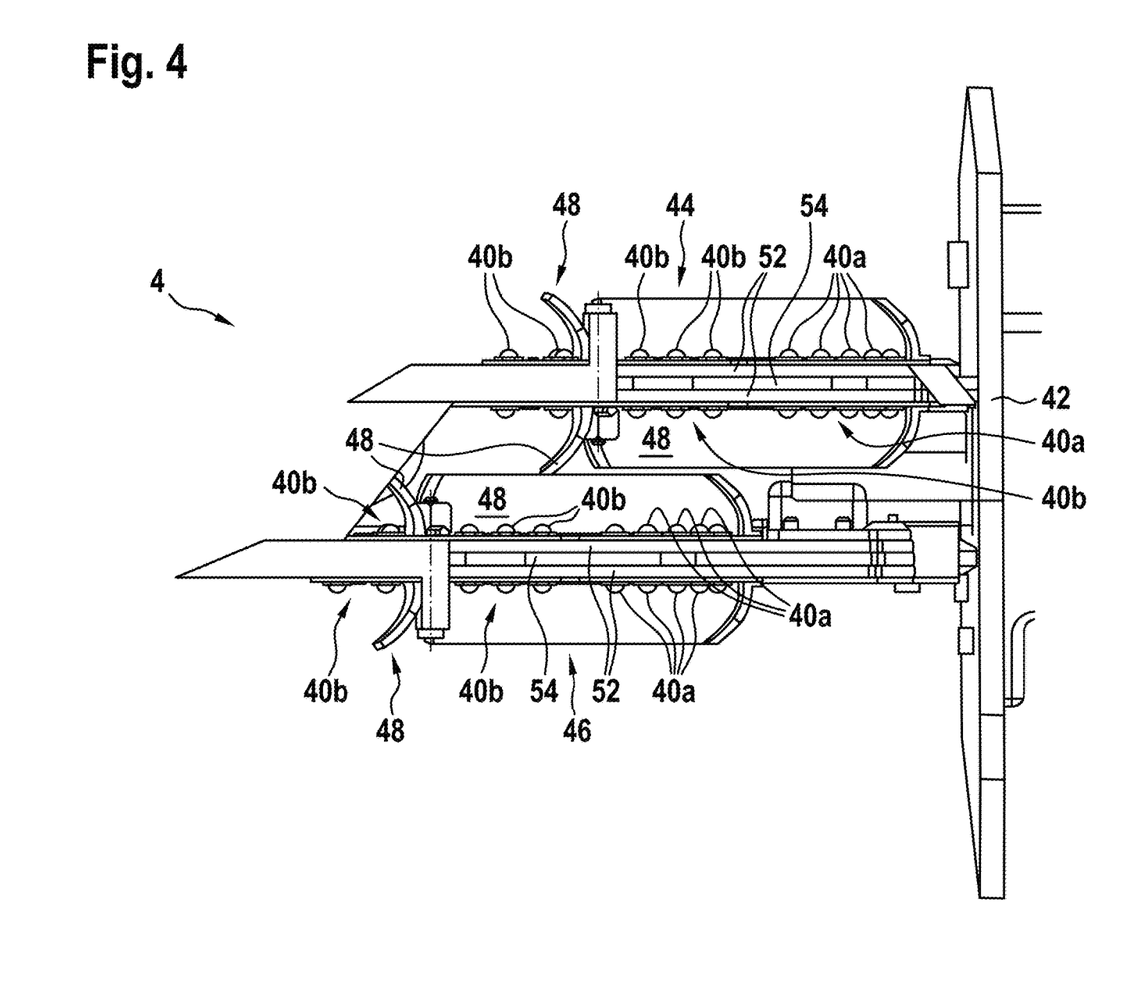
FIG. 4 shows a schematic side view of an aircraft light unit, in particular a wing tip anti-collision aircraft light unit according to an exemplary embodiment of the invention.

FIG. 4 shows a schematic side view of an aircraft light unit, in particular a wing anti-collision aircraft light unit 4 according to an exemplary embodiment of the invention.

In FIG. 4, the cover lens 32 is not shown, in order to allow for a better view on the other parts of the aircraft light unit 4.

The aircraft light unit 4 comprises an upper light head 44 and a lower light head 46. Both light heads 44 and 46 have the same configuration. Each light head 44 and 46 comprises an arcuate reflector element 48 and upper and lower circuit boards 52 supporting a plurality of light sources 40a, 40b, such as LEDs, respectively. A carrier plate 54 is arranged between the upper and the lower circuit boards 52. The upper and lower circuit boards 52 are fixed in an appropriate manner to the carrier plate 54, they, for example, may be screwed together.

The light sources 40a, 40b, which in the embodiment shown in FIG. 4 direct into upper and lower directions, respectively, and the arcuate reflector elements 48 are arranged such that light is projected into the desired directions, in particular the predefined first and second spatial sectors 10, 12 shown in FIG. 1. Different types of light sources 40a, 40b, in particular first light sources 40a and second light sources 40b may be used in order to cause the desired spatial distribution of "cold" and "warm" light, as its has been described in detail before, in particular with reference to FIG. 1.

The reflector elements 48 are fixed to the carrier plate 54 and they can also be fixed to one or both of the circuit boards 52. The reflector elements 58, the carrier plates 54 and preferably also the upper and lower circuit boards 52 are attached to a mounting portion 42 which is shown in FIG. 4 to the right-side of the aircraft light unit 4 and which is configured for mounting the aircraft light unit 4 to a wing 7 of the aircraft 2.

Figure 5:
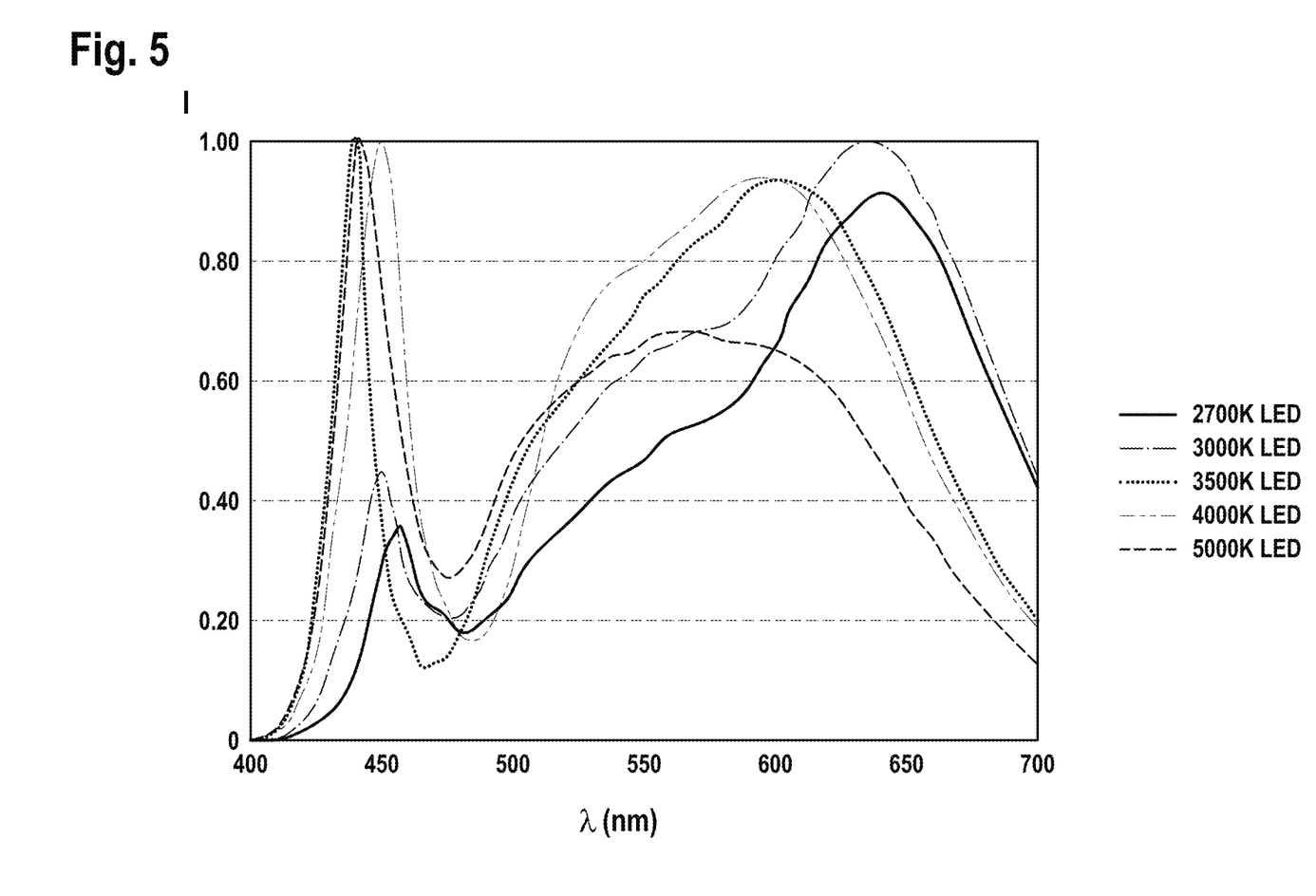
FIG. 5 illustrates a plurality of spectra of a black body at different temperatures.

FIG. 5 illustrates a plurality of spectra of light sources 40a, 40b corresponding to different correlated color temperatures (cct), respectively. The wavelength λ (in nm) is plotted in the horizontal x-axis, while the relative intensity I is plotted on the vertical y-axis.

FIG. 5 in particular illustrates that the peak performance in the range between 550 nm and 700 nm shifts to shorter wavelengths, i.e. to the "blue end" of the spectrum on the left side, when the correlated color temperature is increased. This illustrates that light having a relatively high correlated color temperature comprises a larger portion of blue light than light having a lower correlated temperature. In other words, the spectrum of the light is shifted from red to blue when the correlated color temperature is increased, and it is shifted from blue to red when the correlated color temperature is decreased. It is re-iterated that all depicted spectra result in the emission of white light, just composed differently.

As discussed before, according to exemplary embodiments of the invention, light having a relatively low correlated color temperature, e.g. light having a correlated color temperature of less than 3500 K, which comprises a relatively small amount of blue light, is emitted into the predefined first spatial sector 10, and light having a relatively high correlated color temperature, e.g. light having a correlated color temperature of more than 3500 K, which comprises a larger amount of blue light, is emitted into the predefined second spatial sector 12.

Figure 6:
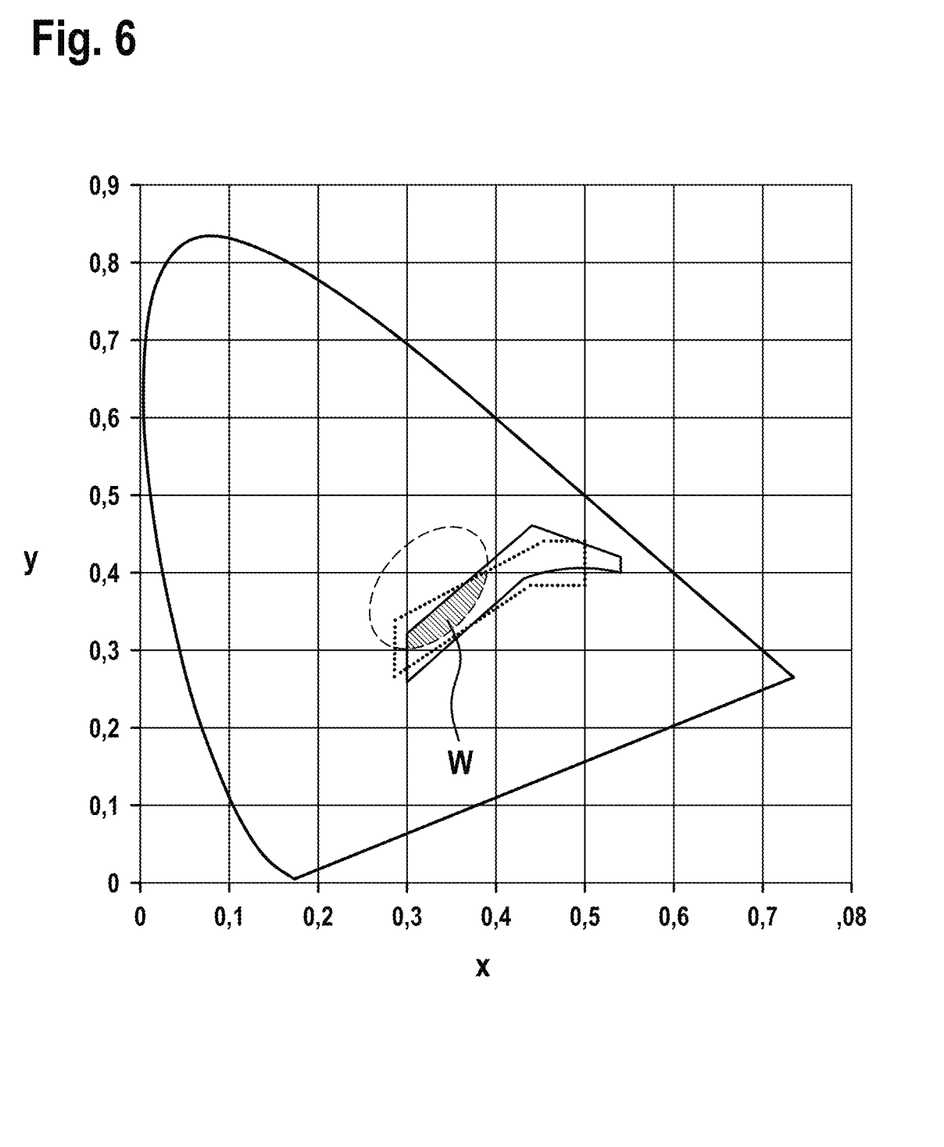
FIG. 6 illustrates a chromaticity diagram with the areas of "white light" according to different aviation standards.

FIG. 6 illustrates the areas of "white light" according to different aviation standards plotted in a chromaticity diagram. The area defined by the solid line corresponds to the FAR 25.1397 standard, the area defined by the dotted line corresponds to the SAE AS 8037 standard, and the area defined by the dashed line corresponds to the MIL-L3009 standard.

In order to comply with these standards, the first and second light outputs emitted by an aircraft light unit according to an exemplary embodiment of the invention may lie in at least one of these areas, preferably in the region W in which all three areas overlap.

According to exemplary embodiments of the invention, the first light output, which is emitted into the predefined first spatial sector 10, is located in the right ("red side") portion of said area in order to reduce the risk of glare. The second light output, which is emitted into the predefined second spatial sector, is located in the left ("blue side") portion of said area in order to allow employing more efficient light sources 40b for illuminating the predefined second spatial sector 12.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed, but that the invention will include all embodiments falling within the scope of the appended claims.

The invention claimed is:

1. An aircraft light unit comprising:
a mounting portion, which is configured for mounting the light unit to an aircraft; and
at least one light source, which is configured for emitting light;
wherein the light unit is configured:
to emit at least one first output of white light into a predefined first spatial sector; and
to emit at least one second output of white light into a predefined second spatial sector;
wherein the light of the at least one first output of white light comprises a first percentage of radiation having a wavelength that is shorter than a predefined threshold;
wherein the light of the at least one second output of white light comprises a second percentage of radiation having a wavelength that is shorter than the predefined threshold;
wherein the first percentage of radiation is smaller than the second percentage of radiation; and
wherein, when the aircraft light unit is mounted to the aircraft in the predefined orientation:
the predefined first spatial sector, when projected on a horizontal plane, extends in an area between a fuselage of the aircraft and an outer line (A) extending through the aircraft light unit in a forward direction; and
the predefined second spatial sector, when projected on a horizontal plane, extends from the outer line (A) to the outside of the aircraft.

2. The aircraft light unit according to claim 1, wherein the predefined threshold is between 450 nm and 500 nm.

3. The aircraft light unit according to claim 1, wherein the light of the first output of white light has a lower correlated color temperature than the light of the second output of white light, wherein the correlated color temperature of the light of the first output of white light below 3500 K and wherein the correlated color temperature of the light of the second output of white light is above 3500 K.

4. The aircraft light unit according to claim 1, wherein the predefined first spatial sector, when projected on a horizontal plane, extends between an inner line (B), which extends from the aircraft light unit to a front end of the aircraft, and an outer line (A; C), which extends from the aircraft light unit in a forward direction laterally outside the inner line (B) such that the predefined first spatial sector is defined by the inner and outer lines (B, A; C), wherein the outer line (A) in particular extends through the aircraft light unit in a direction which is parallel to a longitudinal axis (L) of the aircraft.

5. The aircraft light unit according to claim 1, wherein the predefined first spatial sector, when projected on the horizontal plane, has an opening angle (β) in a range of 10° to 40°, in particular an opening angle (β) in a range of 30° to 40°, more particularly in a range of 34° to 36°.

6. The aircraft light unit according to claim 1, further comprising an optical system, which in particular includes at least one lens and/or at least one reflector element and which is configured for focusing the emitted light, in particular the light which is emitted as one of the first and second outputs of white light.

7. The aircraft light unit according to claim 1, wherein the at least one light source (40a, 40b) comprises or is at least one LED.

8. The aircraft light unit according to claim 1, wherein the light unit comprises a plurality of light sources including:
at least one first light source which is configured to emit light of the first output of white light; and
at least one second light source which is configured to emit light of the second output of white light;
wherein the percentage of radiation emitted by the at least one first light source having a wavelength that is shorter than the predefined threshold in particular is smaller than the percentage of radiation emitted by the at least one second light source having a wavelength that is shorter than the predefined threshold.

9. The aircraft light unit according to claim 8, wherein less than 33% of the light sources are first light sources.

10. The aircraft light unit according to claim 1, further comprising at least one optical filter which is configured for at least partially blocking radiation having a wavelength that is shorter than the predefined threshold, wherein the at least one optical filter in particular is arranged so that the radiation emitted as the first output of white light is transmitted through at least one optical filter.

11. The aircraft light unit according to claim 1, wherein the aircraft light unit is configured to emit light having an intensity, in particular a peak intensity, of at least 100 cd, in particular light having an intensity, in particular a peak intensity, of 400 cd to 2000 cd.

12. The aircraft light unit according to claim 1, wherein the aircraft light unit is a white wing-tip anti-collision strobe light unit.

13. The aircraft light unit according to claim 1, wherein the light unit is at least one of: a landing light unit, a take-off light unit, a taxi light unit and a multi-functional light unit providing at least two of the functionalities of a landing light unit, a take-off light unit, and a taxi light unit.

14. The aircraft light unit according to claim 1, wherein the mounting portion is configured for mounting the light unit to a fuselage or to a wing tip of the aircraft.

15. An aircraft, comprising at least one aircraft light unit according to claim 14 mounted to at least one of: a fuselage of the aircraft, to a wing of the aircraft, or to a wing tip of the aircraft.

* * * * *